(12) United States Patent
Winzell et al.

(10) Patent No.: US 12,264,970 B2
(45) Date of Patent: Apr. 1, 2025

(54) METHOD, DEVICE, AND SYSTEM FOR TEMPERATURE CALIBRATION AND DETERMINATION OF A TEMPERATURE IN A SCENE

(71) Applicant: Axis AB, Lund (SE)

(72) Inventors: Thomas Winzell, Lund (SE); Anthony Hawkins, Lund (SE)

(73) Assignee: AXIS AB, Lund (SE)

( * ) Notice: Subject to any disclaimer, the term of this patent is extended or adjusted under 35 U.S.C. 154(b) by 983 days.

(21) Appl. No.: 17/192,927

(22) Filed: Mar. 5, 2021

(65) Prior Publication Data

US 2021/0293626 A1    Sep. 23, 2021

(30) Foreign Application Priority Data

Mar. 23, 2020   (EP) .................................. 20164801

(51) Int. Cl.
*G01J 5/00*       (2022.01)
*G01J 5/02*       (2022.01)
(Continued)

(52) U.S. Cl.
CPC ............... *G01J 5/007* (2013.01); *G01J 5/02* (2013.01); *G01J 2005/0077* (2013.01);
(Continued)

(58) Field of Classification Search
CPC .... G01J 5/007; G01J 5/02; G01J 5/064; G01J 5/80; G01J 2005/0077; G01J 2005/0092;
(Continued)

(56) References Cited

U.S. PATENT DOCUMENTS 6,267,501 B1    7/2001  Wand et al.
7,683,321 B1    3/2010  King et al.
(Continued)

FOREIGN PATENT DOCUMENTS

CN    103226731 A    7/2013
CN    110312919 A    10/2019
(Continued)

OTHER PUBLICATIONS

Office Action mailed Dec. 31, 2024, in Chinese Application No. 202110280690.0, 20 pages with English Translation.

*Primary Examiner* — Son T Le
*Assistant Examiner* — Janice M Soto
(74) *Attorney, Agent, or Firm* — XSENSUS LLP

(57) ABSTRACT

A method for temperature calibration and determination of a temperature in a scene. At each time point out of a plurality of time points in a first period of time, collecting an ambient temperature representing a temperature at a first part of the scene and collecting thermal image sensor signal values corresponding to the collected ambient temperatures and relating to the first part. Determine a calibration function based on the collected ambient temperatures and the thermal image sensor signal values corresponding to each of the collected ambient temperatures. In a second period of time, capturing a thermal image of the scene comprising thermal image sensor signal values relating to a second part of the scene and determine a temperature at the second part of the scene based on the calibration function and based on thermal image sensor signal values comprised in the thermal image.

14 Claims, 6 Drawing Sheets

(51) Int. Cl.
   *G01J 5/06* (2022.01)
   *G01J 5/80* (2022.01)
(52) U.S. Cl.
   CPC ....... *G01J 2005/0092* (2013.01); *G01J 5/064* (2022.01); *G01J 5/80* (2022.01)
(58) Field of Classification Search
   CPC .... G01J 5/20; G01J 5/0014; G01J 5/16; G01J 5/0022; G01J 5/027; G01J 5/53; G01K 1/02
   See application file for complete search history.

(56) References Cited

U.S. PATENT DOCUMENTS

| | | | |
|---|---|---|---|
| 8,063,372 B2* | 11/2011 | Lemieux | G01J 5/08 250/339.04 |
| 2005/0029453 A1 | 2/2005 | Allen et al. | |
| 2008/0192798 A1* | 8/2008 | Weng | G01J 5/53 374/2 |
| 2008/0210872 A1* | 9/2008 | Grimberg | G01J 5/53 250/339.04 |
| 2014/0008526 A1* | 1/2014 | Zeng | H04N 5/33 250/252.1 |
| 2014/0321501 A1* | 10/2014 | Bartonek | G01J 5/0808 374/121 |
| 2015/0009335 A1 | 1/2015 | Strandemar | |
| 2017/0358105 A1 | 12/2017 | Torres et al. | |
| 2018/0180485 A1* | 6/2018 | Macmillan | G01J 5/10 |
| 2018/0191967 A1 | 7/2018 | Kester | |

FOREIGN PATENT DOCUMENTS

| | | |
|---|---|---|
| WO | 2004/097389 A2 | 11/2004 |
| WO | 2004/097389 A3 | 1/2005 |

* cited by examiner

METHOD, DEVICE, AND SYSTEM FOR TEMPERATURE CALIBRATION AND DETERMINATION OF A TEMPERATURE IN A SCENE

CROSS-REFERENCE TO RELATED APPLICATION

This application claims priority to European Patent Application No. 20164801.1, filed on Mar. 23, 2020, the entire disclosure of which is incorporated by reference herein.

TECHNICAL FIELD

Embodiments herein relate to the field of thermal cameras. Especially, embodiments herein relate to temperature calibration and determination of a temperature in a scene.

BACKGROUND

A thermal camera, sometimes referred to as a thermographic camera, an infrared camera, a thermal imaging camera or an infrared thermography, is an imaging device that forms a heat zone image using infrared radiation, similar to a common camera that forms an image using visible light. Instead of the 380-780 nanometre range of the visible light camera, thermal cameras operate in wavelengths from about 3 micrometres up to about 14 micrometres.

Thermal cameras have applications in a wide range of areas, such as object detection, anomaly detection, fire monitoring, trend analysis, just to give some examples. In many of these applications it is of importance to accurately measure temperature(-s) in an imaged scene. However, today it is both difficult and costly to calibrate thermal cameras to measure temperature accurately.

For example, the thermal camera may be calibrated at a manufacturing factory by placing the thermal camera in a calibration chamber or calibration room having a constant chamber/room temperature. Once the thermal camera has acclimatized to the constant temperature in the calibration chamber, various objects of different well-defined absolute temperatures are placed one at a time in front of the thermal camera in order to calibrate the thermal camera. Especially, each object is placed in a scene covered by the field of view of the thermal camera. For each object temperature, the thermal camera captures an image of the scene and records a respective image sensor signal value for each sensor element of the image sensor. When sensor signal values have been recorded for all the various objects a calibration function for each sensor element is determined. The calibration function relates absolute temperatures to sensor signal values. Since a plurality of objects of different well-defined temperatures must be placed in the calibration chamber and since sensor signal values for each sensor element of the image sensor have to be recorded in order to obtain the calibration function, the calibration procedure is very time-consuming. Sometimes, a thermal camera is said to be fully calibrated when a calibration function is determined for each sensor element of the thermal camera.

U.S. Pat. No. 6,267,501 B1 describes another example of factory calibration using a calibration chamber. In this example, the thermal camera is arranged in the calibration chamber at a controlled ambient temperature. The thermal camera looks through a wall of the calibration chamber to a scene which is isothermal across the scene and this temperature is presented to all sensor elements of the thermal camera. During the calibration of the thermal camera, both the chamber temperature and the scene temperature are varied. Especially, for each chamber temperature, the scene temperature is varied within a temperature interval and for each scene temperature the thermal camera records sensor signal values through the window of the calibration chamber. Thereafter, the chamber temperature is changed, and the thermal camera records sensor signal values for each scene temperature in the temperature interval. When sensor signal values have been recorded for all the temperatures, i.e. for all chamber temperatures in combinations with all scene temperatures, a calibration function for each sensor element and each chamber temperature is determined. The calibration function of each sensor element relates absolute temperatures to sensor signal values for the thermal camera operating at the chamber temperature. Since the calibration function is determined for each sensor element also in this example, the thermal camera is said to be fully calibrated.

FIG. 1A schematically illustrates exemplifying calibration functions for different sensor elements of a thermal camera said to be fully calibrated. The calibration function for the sensor elements marked with an "A" is shown as a curve A, the calibration function for the sensor elements marked with a "B" is shown as a curve B, and the calibration function for the sensor elements marked with a "C" is shown as a curve C. In FIG. 1A, each calibration function is valid for three sensor elements. However, this is only an example and it should be understood that each calibration function may be valid for another number of sensor elements. FIG. 1A also shows that the calibration is performed over a wide range of temperatures, e.g. between 0 and 300 degrees Celsius.

Some drawbacks with at least some of the fully calibrated thermal cameras are that they are time-consuming to calibrate and that they have to be re-calibrated after a couple of years, sometimes even annually. Then the thermal cameras have to be sent back to the factory and one of the procedures described above has to be performed again. This is especially inconvenient for thermal cameras mounted at locations far away from the factory.

FIG. 1B schematically illustrates an exemplifying calibration function for different sensor elements of a thermal camera said to be standard calibrated. By the expression "standard calibrated" when used in this disclosure is meant that the same type of thermal cameras is calibrated using a single calibration function. The calibration function is sometimes referred to as a default calibration function. As can be seen in FIG. 1B, the calibration function is the same for all nine sensor elements.

A drawback with standard calibrated thermal cameras is that the single calibration function is used to calibrate the thermal cameras of the same type, i.e. to calibrate thermal cameras having the same type of image sensor. Thus, variations in performance of the individual sensor elements are not taken into consideration in the calibration. Another drawback with some of the standard calibrated thermal cameras is that also they may have to be re-calibrated after a couple of years, sometimes even annually. Depending on for example the age of the standard calibrated thermal camera, the camera may be calibrated using a new single calibration function taking the aging of the camera, i.e. the aging of the image sensor, into account.

US 2018/0191967 A1 discloses an infrared (IR) imaging system for determining a concentration of a target species in an object is disclosed. The imaging system can include an optical system including an optical focal plane array (FPA) unit. The optical system can have components defining at least two optical channels thereof, said at least two optical channels being spatially and spectrally different from one another. Each of the at least two optical channels can be positioned to transfer IR radiation incident on the optical system towards the optical FPA. The system can include a processing unit containing a processor that can be configured to acquire multispectral optical data representing said target species from the IR radiation received at the optical FPA.

SUMMARY

In view of the above, it is thus an object of embodiments disclosed herein to overcome or at least mitigate the drawbacks discussed above. In particular, it is an object to provide a method, a device, and a system which provide a simple temperature calibration of a thermal camera and still provide a sufficient accurate determination of a temperature in a scene.

Embodiments disclosed herein are applicable for in-situ calibration of the thermal camera. By the expression "in-situ temperature calibration" when used in this disclosure is meant that the temperature calibration takes place at the same location as the thermal camera is operating or is to be operating. Thus, the location may be the same location as the one the thermal camera is installed in when in operation. The in-situ calibration enables on the fly calibration of the thermal camera, i.e. calibration of the thermal camera during normal operation of the thermal camera.

According to an aspect, the object is achieved by a method for temperature calibration and determination of a temperature in a scene.

At each time point out of a plurality of time points in a first period of time, collecting an ambient temperature representing a temperature at a first part of the scene to obtain collected ambient temperatures spanning over a range of ambient temperatures and by means of a thermal camera, collecting one or more thermal image sensor signal values corresponding to the collected ambient temperatures and relating to the first part of the scene.

A calibration function is determined based on the collected ambient temperatures and the one or more thermal image sensor signal values corresponding to each of the collected ambient temperatures. The calibration function gives temperature as a function of thermal image sensor value.

In a second period of time, the thermal camera captures a thermal image of the scene, wherein the thermal image comprises thermal image sensor values relating to a second part of the scene.

In the second period of time, a temperature at the second part of the scene is determined based on the calibration function and based on one or more thermal image sensor signal values comprised in the captured thermal image of the scene and relating to the second part of the scene.

With such a method, the calibration function is determined based on collected ambient temperatures representing temperatures at the first part of the scene and the one or more thermal image sensor signal values corresponding to each of the collected ambient temperatures. The calibration function may for instance be created by regression analysis, whereby a mathematical function is found, that most closely fits the collected data. A function may thereby be created and adjusted to fit the collected values. The scene may be the scene the thermal camera is arranged to monitor when in operation, and the first part of the scene may correspond to the field of view of the thermal camera or it may correspond to a part of the field of view. The first part of the scene may be a background part of the scene, and it may be selected such that it comprises one or more background areas having a temperature, e.g. a common temperature, such that the ambient temperature represents this temperature. It should be understood that it is important to select the first part of the scene, which may comprise the background areas, so that the ambient temperature can be said to represent the temperature in the first part of the scene, e.g. in a way so that the ambient temperature and the common temperature may be the same or almost the same temperature. An example may be where the first part of the scene is selected to be a part of the scene that is known to, or assumed to, have a temperature that coincides and varies with a measured air temperature in the scene. The ambient temperature is the temperature of the air, or other medium, and surroundings within the geographical location of the scene as measured by a thermometer or other temperature indicating device or received from a weather-service. The one or more background areas of the first part of the scene may be areas comprising bushes, trees, fences, facades or a combination of these, just to give some examples.

In this disclosure, the collected ambient temperatures and collected thermal image sensor signal values are collectively sometimes referred to as the collected calibration data.

The first period of time may be a long period of time, and by a long period of time is meant a time period spanning over one or more days, months or even years. Thus, by collecting the calibration data at a plurality of time points in the first period of time, the calibration data may be collected over one or more days, months or even years. Typically, the thermal camera is located outdoors, and since the calibration data is collected during the first period of time, the collected calibration data may span over a range of ambient temperatures comprising day and night temperatures and season dependent temperatures and may span over a range of sensor signal values. It should be understood that the accuracy of the determined calibration function will improve with an increasing range of collected ambient temperatures and an increasing range of sensor signal values collected calibration data. However, it should be understood that even if the thermal camera is located indoors and thus not exposed to the same temperature variations, collection of calibration data over a long period of time will increase the accuracy in the determined calibration function since the number of collected calibration data will increase.

The calibration function used for determining the temperature at the second part of the scene in the second period of time, may be the latest determined calibration function. However, it should be understood that, the collection of calibration data may continue after the temperature determination, whereby a new latest calibration function may be determined based on the calibration data collected before and after the latest temperature determination. This new latest determined calibration function may then be used for temperature determination at a new time point in the second time period.

Thanks to the collection of calibration data from a first part of the scene over a long time, while providing for determination of a temperature in a second part of the scene, on the fly, calibration of the thermal camera is enabled. Thus, the thermal camera may be calibrated during its normal operation. This method of updating the calibration function, also during normal operation provides the benefit of increasing the number of time points during the first period of time, thereby increasing the accuracy of the calibration, and also taking changes within the thermal image sensor over time into account.

According to another aspect, the object is achieved by a thermal camera system for temperature calibration and determination of a temperature in a scene.

A collecting unit is configured to, at each time point out of a plurality of time points in a first period of time, collect an ambient temperature representing a temperature at a first part of the scene to obtain collected ambient temperatures spanning over a range of ambient temperatures.

A thermal camera is configured to be located at the scene. Further, the thermal camera is configured to, at each time point out of the plurality of time points in the first period of time, collect one or more thermal image sensor signal values corresponding to the collected ambient temperatures and relating to the first part of the scene.

A calibration function determination unit is configured to determine a calibration function based on the collected ambient temperatures and the one or more thermal image sensor signal values corresponding to each of the collected ambient temperatures. The calibration function gives temperature as a function of thermal image sensor value.

The thermal camera is configured to, in a second period of time, capture a thermal image of the scene, wherein the thermal image comprises thermal image sensor values relating to a second part of the scene.

Further, a temperature determination unit is configured to, in the second period of time, determine a temperature at the second part of the scene based on the calibration function and based on one or more thermal image sensor signal values comprised in the captured thermal image of the scene and relating to the second part of the scene.

According to another aspect, the object is achieved by a computer program product comprising a computer-readable storage medium with instructions adapted to carry out actions of the method described herein when executed by a processor.

BRIEF DESCRIPTION OF THE DRAWINGS

Embodiments will now be described in more detail by way of example and with reference to the accompanying schematic drawings, where the same reference numerals will be used for similar elements, wherein.

DETAILED DESCRIPTION OF EMBODIMENTS

Embodiments will now be described more fully hereinafter with reference to the accompanying drawings. The invention may, however, be embodied in many different forms and should not be construed as limited to the embodiments set forth herein. The systems and devices disclosed herein will be described during operation.

Figure 1A:
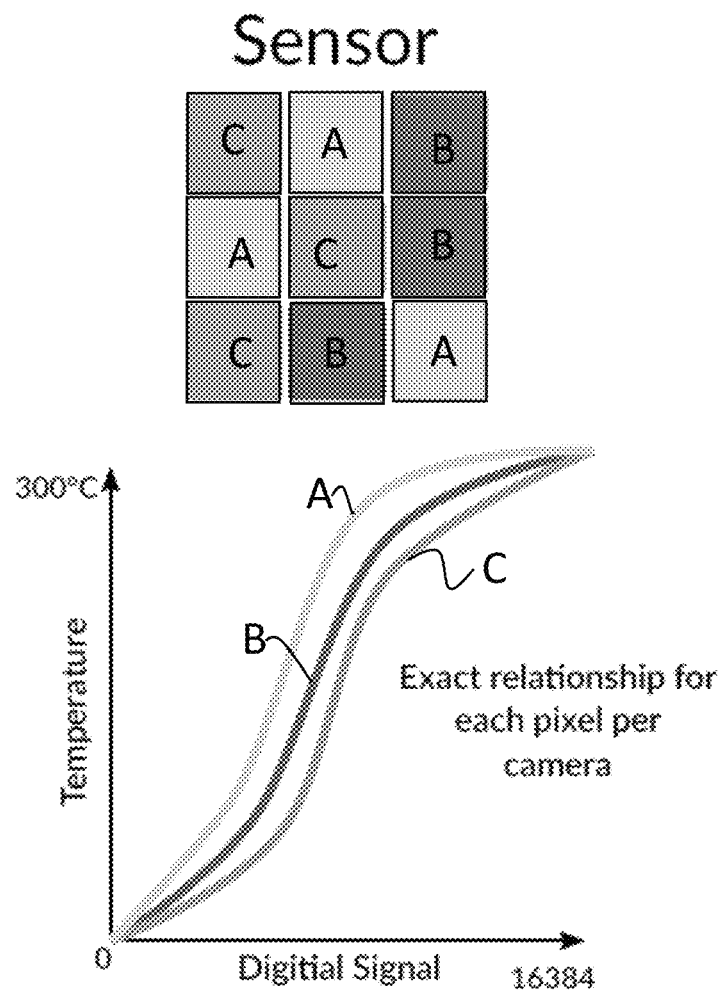
FIG. 1A schematically illustrates calibration functions for a fully calibrated thermal camera according to prior art.
Figure 1B:
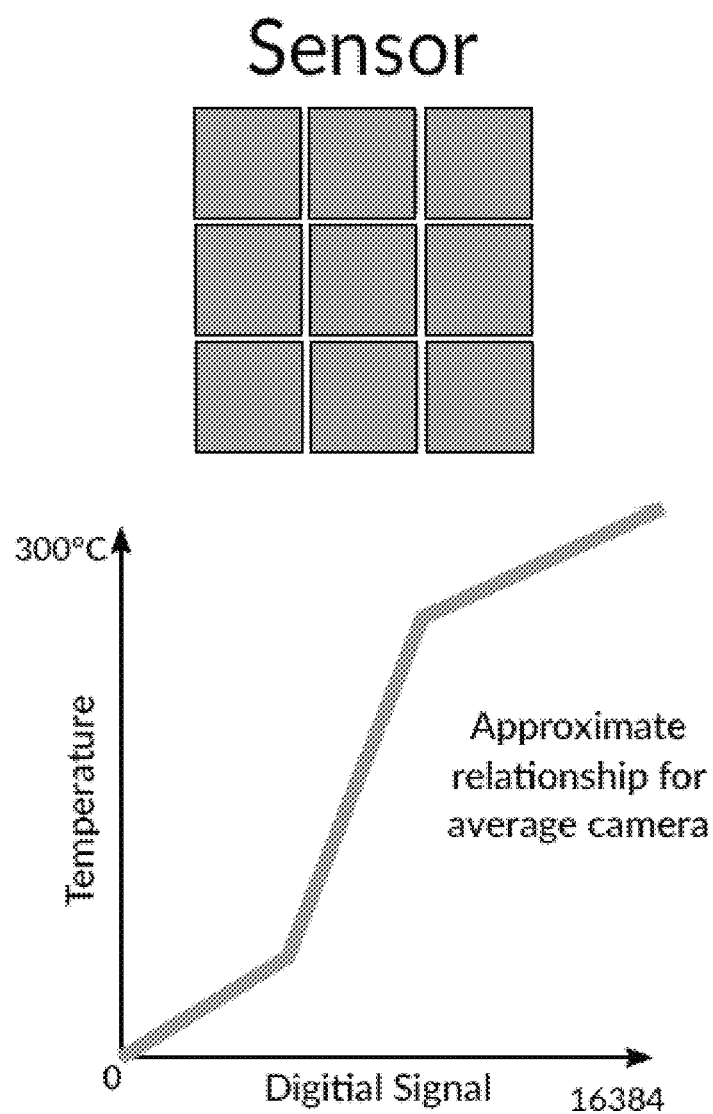
FIG. 1B schematically illustrates calibration functions for a standard calibrated thermal camera according to prior art.
Figure 2:
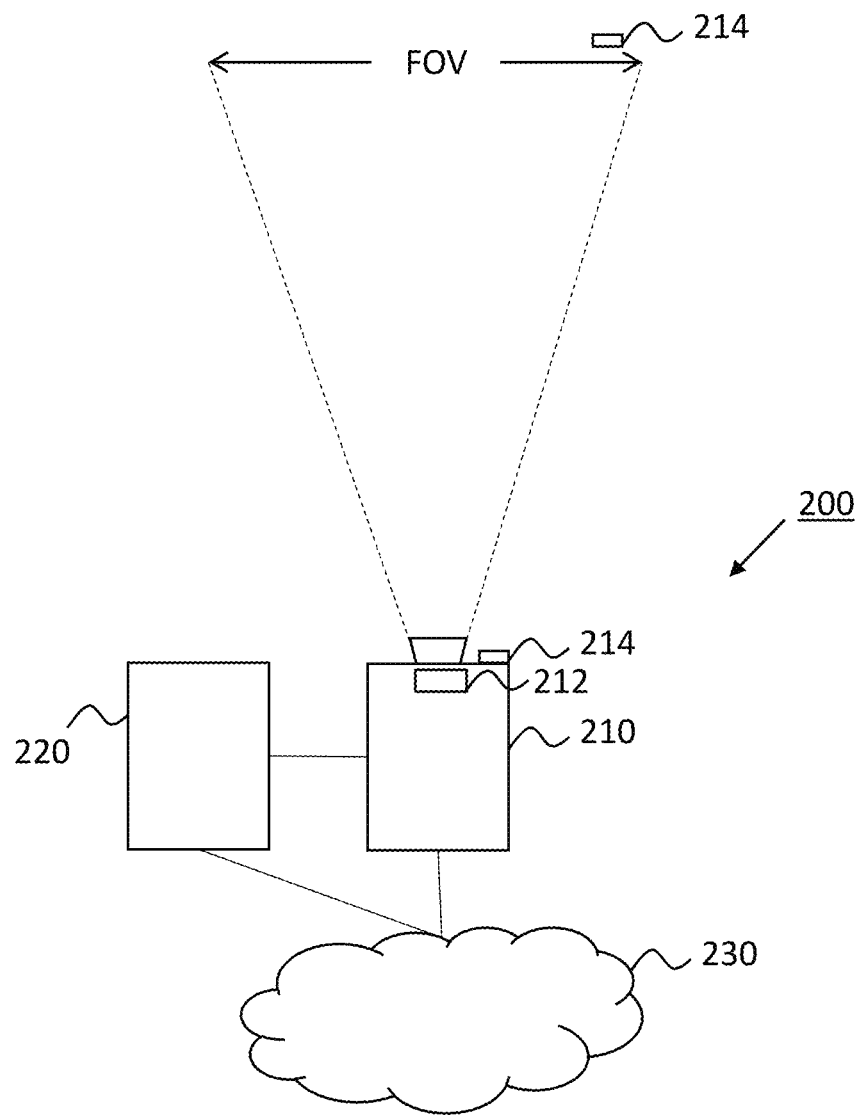
FIG. 2 schematically shows a thermal camera system according to embodiments.

FIG. 2 schematically shows a thermal camera system 200 comprising a thermal camera 210 arranged at a scene, e.g. a scene of interest for thermal monitoring. A one-dimensional field of view (FOV) of the thermal camera 210 is schematically illustrated between the two dashed lines. However, it should be understood that the field of view of the thermal camera 210 is two-dimensional.

The thermal camera 210 may generally be any type of digital thermal camera, comprising a detector of infrared radiation in the form of a thermal image sensor, and which is capable of capturing thermal images of a scene based on infrared radiation emitted from the scene. For example, the thermal camera 210 may be or may comprise an uncooled thermal camera, that may comprise an internal thermometer. However, the thermal camera 210 may be or may comprise a cooled thermal camera, such as a thermoelectrically cooled thermal camera.

The thermal camera 210 may be operatively connected, via wire or wirelessly, to a processing device 220. The processing device 220 may be physically separate from the thermal camera 210, as illustrated in FIG. 2, or it may be integrated in the thermal camera 210. In embodiments, wherein the processing device 220 is physically separated from the thermal camera 210, the processing device 220 is referred to as an external processing device. The thermal camera 210 and the processing device 220 may each be connected to a network 230.

The processing device 220, and the components thereof, may be implemented in software or in hardware, or a combination thereof. In particular, the processing device 220 may comprise a processor 222 and a memory 224. The memory may act as a (non-transitory) computer-readable storage medium or device for storing computer code instructions which, when executed by the processor, are adapted to carry out any method disclosed herein.

Further, the processing device 220 may be implemented on a computing platform, for instance a personal computer, a custom-built embedded system, a mobile device or by one or more of the cameras in a multi camera system. Some or all of the functionality of the processing device 220 within the camera system 200, may be incorporated in a software application such as a Video Management System (VMS), a monitoring tool or a separate temperature calibration and determination application.

The network 230 may be any suitable network, e.g. a communications network such as a wired communications network, a wireless communications network or a combination thereof. The communications network may be a computer network, a telecommunications network or a combination thereof. For example, the network 230 may be a Local Area Network (LAN), a Wide Area Network (WAN), the Internet, a cellular network, a wireless network, a WiFi-network, a cable-based network, an ethernet based network etc. or a combination of these.

Figure 3:
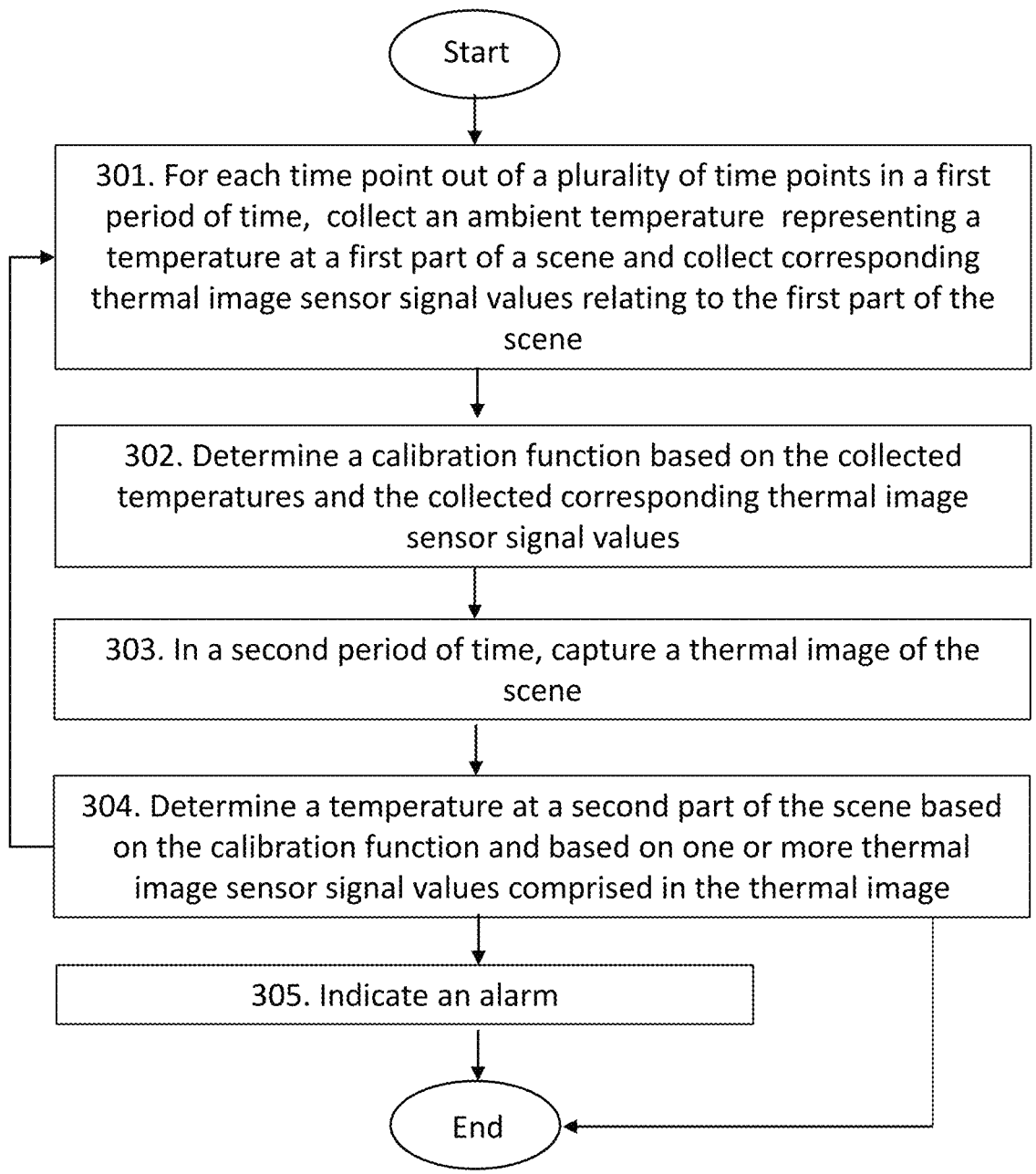
FIG. 3 is a flowchart of a method for calibration and temperature determination according to embodiments.

FIG. 3 schematically illustrates embodiments of a method for temperature calibration and determination of a temperature in a scene. A thermal camera 210 is located at the scene. The thermal camera 210 operates in the thermal camera system 200 and captures thermal images of the scene. It should be understood that one or more of the actions described below may be optional, and that actions may be combined or taken in another suitable order.

Action 301

At each time point out of a plurality of time points in a first period of time $t_1$, an ambient temperature representing a temperature at a first part of the scene is collected.

Further, at each time point out of a plurality of time points in a first period of time $t_1$, the thermal camera 210 collects one or more thermal image sensor signal values corresponding to the collected ambient temperatures and relating to the first part of the scene.

As previously mentioned, a thermal image sensor may collect thermal images of a scene covered by the field of view of the thermal camera, and the thermal images comprise thermal image sensor values from the full field of view of the thermal camera. The thermal image sensor signal values are registered by image sensor elements, also commonly referred to as pixels of the thermal sensor image.

As also previously mentioned, the scene may be the scene the thermal camera is arranged to monitor when in operation, and the first part of the scene may correspond to the field of view of the thermal camera or it may correspond to a part of the field of view. Thus, the first part of the scene may correspond to a part of the field of view of the thermal camera 210 or to the entire field of view of the thermal camera 210. Therefore, the first part of the scene may correspond to a part of a captured thermal image or to an entire captured thermal image. As also previously mentioned, the first part of the scene may be a background part of the scene, and it may be selected such that it comprises one or more background areas having a temperature, e.g. a common temperature, such that the ambient temperature represents this temperature. It should be understood that it is important to select the first part of the scene, which may comprise the background areas, so that the ambient temperature can be said to represent the temperature in the first part of the scene, e.g. in a way so that the ambient temperature and the common temperature may be the same or almost the same temperature. An example may be where the first part of the scene is selected to be a part of the scene that is known to, or assumed to, have a temperature that coincides and varies with a measured air temperature in the scene. The ambient temperature is the temperature of the air, or other medium, and surroundings within the geographical location of the scene as measured by a thermometer or other temperature indicating device or received from a weather-service. The one or more background areas of the first part of the scene may be areas comprising bushes, trees, fences, facades or a combination of these, just to give some examples. In difference to previously described prior art, the idea here is not to use a specific object having a known temperature for the calibration. Instead a part, or parts, of the image is assumed to have the same temperature as an ambient temperature, which is the temperature that is measured in the scene, e.g. by a thermometer located within or near the thermal image senor or by a weather station close by.

Some examples of how to select the first part of the scene will now be described.

In a first example, the first part of the scene is selected, e.g. manually selected, based on one or more image sensor elements recording infrared radiation from one or more suitable scene areas such as vegetation, non-directly sun-lit areas, parts in shade and avoiding surfaces having a glossy finishing and reflecting the sky or the sun. These scene areas are considered suitable since their temperatures will be the same as or almost the same as the ambient temperature of the scene. Finding these suitable scene areas may be carried out using image analytics tools, such as a classification of materials within the scene. That said, in an outdoor environment and cloudy weather most materials within a scene tend to have similar temperatures and will therefore represent the collected ambient temperature rather well. Hence, the collection of calibration data may be concentrated to time periods with cloudy weather, information of which may be provided from a real-time weather service.

In a second example, the first part of the scene is selected, e.g. automatically selected by the processor 222 of the thermal camera 210, by firstly, calculating an average of thermal image sensor signal values from all or a part of the image sensor elements recording a thermal image, and secondly, comparing one or more of the thermal image sensor signal values with the average, and thirdly, determining the first part of the scene to correspond to one or more image sensor elements having thermal image sensor signal values within an interval comprising the average. This procedure may be iterated by calculating a new average of thermal image sensor signal values based on the thermal image sensor signal values lying within the previous interval, and determining the first part of the scene to correspond to one or more image sensor elements having thermal image sensor signal values within an interval, e.g. a new interval, comprising the new average.

The size of the interval comprising the calculated average may be determined based on a standard deviation of the thermal image sensor signal values used to calculate the average.

When calculating the average thermal image sensor signal values outliers may be excluded. Also, in this second example weather information indicating sunny or cloudy weather may be taken into consideration, as typically signals far from the average in sunny weather are less likely to correspond to the ambient temperature and may be disregarded.

The thermal camera 210 capturing the thermal image has a thermal image sensor 212 comprising a plurality of image sensor elements. Infrared radiation emitted from the first part of the scene will be recorded by a group of image sensor elements. Thus, the thermal image sensor signal values from this group of thermal sensor elements relates to the first part of the scene. For each time point out of the plurality of time points in the first period of time $t_1$, the thermal camera 210 may collect the thermal image sensor signal values relating to the first part of the scene from a thermal image captured at each respective time point.

In some embodiments, the first period of time is a long period of time, such as 24 hours, several days, weeks, months and even years. Thus, the calibration data is collected over 24 hours, several days, weeks, months or years, both overnight and during the day. Further, the calibration data may be collected over different seasons, e.g. over spring, summer, autumn and/or winter. Depending on the length of the first period of time the range of the collected ambient temperature may vary. For a camera 210 arranged at an outdoor scene and where the collected ambient temperature may be collected for a full 24 hours, the collected calibration data may represent the ambient temperature during the warmest time during the day and the coldest at night-time and several collection data points in between. In another example the collected ambient temperature may be collected for a full year, comprising the hottest summer day as well as the coldest winter day. Also, for a thermal camera 210 arranged at an indoor scene the first time period may be selected so that the collected ambient temperature may vary. The length of the first period of time may be based on the desired range of the collected calibration data. For example, if the difference between the lowest collected ambient temperature and the highest collected ambient temperature is small, the length of the first period of time may be increased until the difference between the lowest collected ambient temperature and the highest collected ambient temperature is larger, e.g. larger than a threshold value such as 5, 10, 20, 30, or 40 degrees Celsius, just to give some examples.

Depending on the application, different temperature ranges of the collected ambient temperature may be needed in order to obtain an acceptable accuracy in the calibration function. For example, if humans are to be monitored by the thermal camera 210 the range of ambient temperatures used for determining the calibration function may be in the range of 25-40 degrees Celsius. As another example, should the thermal camera 210 be calibrated for warm machinery a larger, or different, interval of ambient temperatures is needed or more uncertainty in the calibration function has to be acceptable. Thus, the first time period should be selected to be long enough to incorporate the desired range of temperatures.

In some embodiments, the first period of time is as long as the lifetime of the thermal camera 210. Thus, as long as the thermal camera 210 is operating at the operation location, the calibration data is collected, and the calibration function may be updated and made more accurate, or new calibration functions may be determined. However, it should be understood that a new first period of time may be started at any time during operation of the thermal camera 210, and the calibration data collected during this new first period of time may be used for determining a new calibration function. Further, a new first period of time may be started after a standby or switch-off period during which standby or switch-off period the thermal camera 210 may have been relocated. The benefit of using the most recent collected calibration data to determine the calibration function, the calibration may reflect the most current operation status of the thermal camera.

In some embodiments, one or more out of the collected ambient temperatures are measured by a thermometer 214, as schematically illustrated in FIG. 2. The thermometer 214 may be an internal thermometer, e.g. a Printed Circuit Board (PCB) thermometer comprised within the thermal camera 210, or it may be an external thermometer arranged at the scene externally of the thermal camera 210, or outside of the scene. The thermometer 214 may also be a remote-sensing thermometer, i.e. a thermometer arranged at a distance from the scene and arranged in communication, via wire or wirelessly, with the thermal camera system 200, for instance over the network 230.

Alternatively, or additionally, one or more out of the collected ambient temperatures are collected temperatures from a real-time weather service. Thus, in some embodiments, the thermal camera system 200 may receive or retrieve ambient temperatures from the real-time weather service via the network 230.

For example, the collected ambient temperatures represent ambient temperatures in the range of approximately −40 degrees Celsius to +50 degrees Celsius. Thus, the collected ambient temperatures represent ambient temperatures at an ordinary operation environment for the thermal camera 210.

Action 302

Figure 4:
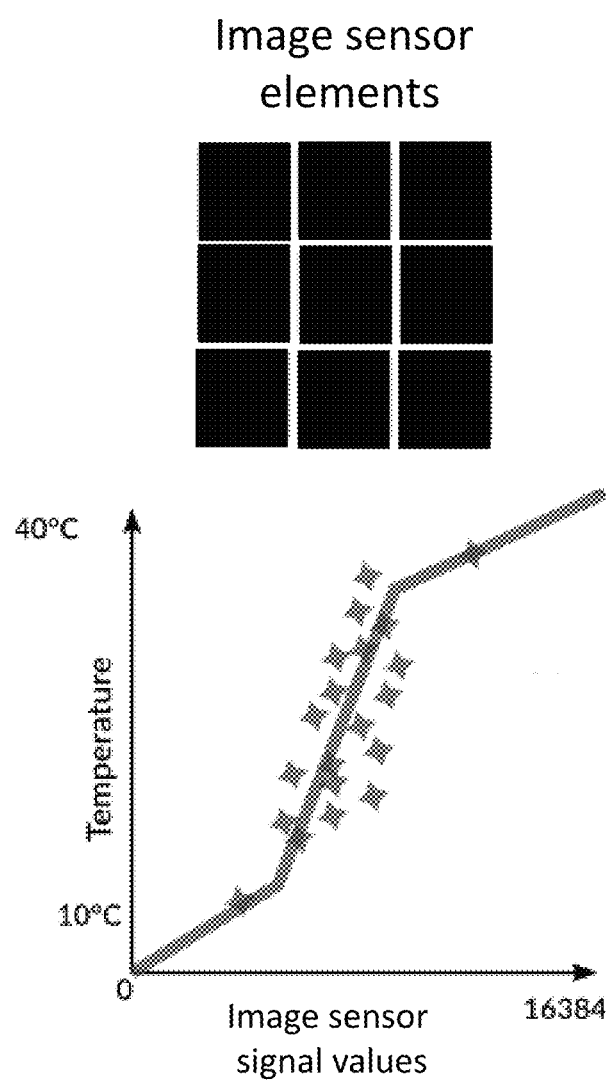
FIG. 4 schematically illustrates a calibration function for a thermal camera determined according to embodiments.

A calibration function is determined based on the collected ambient temperatures and the one or more thermal image sensor signal values corresponding to each of the collected ambient temperatures. As previously mentioned, the collected ambient temperatures represent temperatures at the first part of the scene and the, during the first period of time, collected thermal image sensor values relate to the first part of the scene. The calibration function gives temperature as a function of thermal image sensor value. FIG. 4 shows an example of a calibration function. The exemplified calibration function is determined based on collected ambient temperatures in the range of 10-40 degrees Celsius and based on a number of collected sensor signal values, denoted digital signal in the figure. In FIG. 4, the y-axis shows the temperature in degrees Celsius and the x-axis shows the image sensor signal value as integers. The calibration function for the thermal camera 210 may be determined in real time, post-manufacturing of the thermal camera. Preferably, the calibration function is determined in-situ, i.e. at the installation location for the thermal camera 210 and during operation of the thermal camera 210. Thus, no calibration needs to be performed at the manufacturing site. However, it should be understood that the calibration function may be determined at a first location, e.g. the calibration site, and then the determined calibration may be used and possible also further improved, by the thermal camera 210 located at a second location, e.g. at the operation site.

The calibration function may be determined by means of the thermal camera 210, e.g. by means of the processing device 220 when being comprised in the thermal camera 210. Alternatively, or additionally, the calibration function may be determined by means of an external processing device, e.g. the processing device 220 or a second instance of the processing device 220, arranged externally of and in communication with the thermal camera 210. The thermal camera 210 may be operatively connected, via wire or wirelessly, to the external processing device.

In some embodiments, the calibration function is determined as a function fitting of the collected ambient temperatures and the collected corresponding thermal image sensor signal values. Thus, the calibration function may be the function that best fits all collected ambient temperatures and all collected corresponding thermal image sensor signal values. The calibration function may for instance be represented as a mathematical formula or a look-up table. The determining of the calibration function may incorporate finding one or more temperature thresholds. In this scenario, when a thermal image sensor signal value, measured during the second period of time, is above a certain value this would indicate that the determined temperature is above a certain predetermined temperature.

Hence, the calibration function may be determined as a formula, a look-up-table or as one or more threshold values.

For at least one of the collected ambient temperatures, an average of the one or more thermal image sensor signal values corresponding to the collected ambient temperature may be used in the determining of the calibration function. For example, an average of a number, e.g. 25, sensor signal values corresponding to the collected ambient temperature at the same time point in the first period of time may be used when determining the calibration function. The 25 sensor signal values may be obtained from 25 thermal image sensor elements arranged in a 5×5 matrix. A reason for using an average of sensor signal values instead of all individual sensor signal values is to e.g. reduce the number of sensor signal values that need to be stored, reduce possible errors in individual sensor signal values, or to reduce possible noise in individual sensor signal values, just to give some examples. For example, by using an average of the 25 sensor signal values, only the averaged sensor signal value needs to be stored and used in the determination of the calibration function. Thereby, reducing the amount of storage resources and processing resources needed.

Alternatively, or additionally, one or more out of the collected thermal image sensor signal values used in the determining of the calibration function may be at least one of the collected thermal image sensor signal values collected at the same time point in the first period of time.

The determination of the calibration function may further comprise extrapolation of the calibration function to thermal image sensor signal values giving temperatures outside the range of collected ambient temperatures. The extrapolation may be a linear extrapolation of the collected calibration data. By extrapolating the calibration function, the calibration function can be used to determine a temperature in the scene that lies outside the temperature range of the collected calibration data. For example, extrapolation of the calibration function is needed when the thermal camera 210 should be able to indicate or trigger a fire alarm when an object or a part of the scene has a temperature above 250 degrees Celsius since it would not be possible to collect calibration data comprising so high temperatures.

As previously mentioned, the calibration data is collected during the first period of time. Further, as also previously mentioned, one or more new first periods of time may be started and new calibration data collected. For each first period of time, for each new first period of time or for parts thereof, a respective calibration function may be determined. It should be understood that one or more of the determined calibration functions may be stored together with a respective timestamp. The timestamp may indicate one or more points in time, e.g. a start point in time, a midpoint of time or an end point in time, of the period of time during which the calibration data used in the determination of the calibration function were collected. A stored calibration function associated with a timestamp may be used at a later point in time to determine a temperature in a thermal image captured at a point in time corresponding to or being close to the point in time indicated by the timestamp. Thus, the stored timestamps may be used when deciding which calibration function among a plurality of stored calibration functions to use in the determination of a temperature in a thermal image captured at a certain point in time. How to determine a temperature in a captured thermal image will be described in more detail in Action 304 below.

It should be understood that the determined calibration function may be used by one or more additional thermal cameras of the same type as the thermal camera 210. Thus, even if not shown in the figures, the thermal camera system 200 may comprise a plurality of thermal cameras 210 of the same type. However, the one or more thermal cameras of the same type as the thermal camera 210 comprised in the thermal camera system 200 may also be thermal cameras of a different thermal camera system. By the expression "thermal cameras of the same type" when used in this disclosure is meant that the thermal cameras comprise one or more image sensors of the same type.

Action 303

The thermal camera 210 captures, in a second period of time $\Delta t_2$, a thermal image of the scene comprising thermal image sensor signal values relating to a second part of the scene.

In some embodiments, the thermal camera 210 captures the thermal image of the scene at a first time point in the second period of time $\Delta t_2$.

The second period of time may be non-overlapping with the first period of time. For example, this may be the case when the first period of time during which the calibration data, e.g. the ambient temperature representing the temperature at the first part of the scene and the thermal image sensor signal values relating to the first part of the scene, is collected precedes the second period of time during which the thermal image of the scene is captured. In such scenarios, the calibration data is collected, and the calibration function is determined prior to the capturing of the thermal image of the scene.

However, it should be understood that the second period of time may be at least partly overlapping with the first period of time. This may be the case when the collection of calibration data occurs during a long period of time, e.g. over one or more days, months or even over years, and when the capturing of the thermal image of the scene is made during the first time point in the second period of time $t_2$ which first time point also is comprised in the first period of time $t_1$. The collection of calibration data may continue after the capturing of the thermal image and a new, or updated, calibration function may be determined based on all calibration data collected within the first period of time $\Delta t_1$. It should be understood that sensor signal values of the image captured at the first time point in the second period of time $\Delta t_2$ may be used in the determination of the calibration function prior to the determination of the temperature in the scene.

The first and second parts of the scene may correspond to at least a respective first and second part of a field of view of the thermal camera 210. However, in case of different zooming of the thermal camera 210, the first and second parts of the scene may correspond to a first part of a first field of view and a second part of a second field of view of the thermal camera 210, respectively. This may for example be the case when the calibration data is collected with a first field of view of the thermal camera 210 and when the thermal image used for determining the temperature is captured with a different, second field of view of the thermal camera. As an example, the first part of the scene, where calibration data is collected, may be a field of view with the zoom set to wide angle, and the second part of the scene, where temperature determination is carried out, may be a field of view with the zoom set to telephoto, or the other way around where the zoom is set to telephoto for the first part of the scene and set to wide angle for the second part.

In some embodiments, the first and second parts of the scene are non-overlapping parts of the scene. This may be the case when the first part of the scene used for the collection of calibration data is non-overlapping with the second part of the scene in which the temperature determination is performed. Some examples of when it is advantageous to use non-overlapping parts of the scene are when the second part of the scene comprises noisy objects, such as a moving object or an object providing an unstable image sensor signal. These noisy objects would obscure the calibration data collected in the first part of the scene if the first part of the scene was overlapping with the second part of the scene. In such scenario, more accurate and stable calibration data would be collected if the first and second parts of the scene are non-overlapping.

Alternatively, the first and second parts of the scene are at least partly overlapping parts of the scene. This may be the case when the first part of the scene used for the collection of calibration data is at least partly overlapping with the second part of the scene in which the temperature determination is performed. An example of when it may be advantageous to use at least partly overlapping parts of the scene are when the first part of the scene comprising trees is used for collecting the calibration data and to determining the calibration function and when the at least partly overlapping second part of the scene is used to determine a fire in one of the trees.

Action 304

In a second period of time, a temperature at the second part of the scene is determined based on the calibration function and based on one or more thermal image sensor signal values comprised in a thermal image of the scene and relating to the second part of the scene.

In some embodiments, the temperature at the second part of the scene is determined at a second time point in the second period of time. The second time point may be different from and subsequent to the first time point. As mentioned above, the thermal image may be captured by the thermal camera 210 at the first time point in the second period of time.

The temperature may be determined, by means of the thermal camera 210, e.g. by means of the processing device 220 when being comprised in the thermal camera 210. The temperature may be determined based on the calibration function and on an average of the thermal image sensor signal values comprised in the captured image and relating to the second part of the scene.

Alternatively, or additionally, the temperature may be determined, by means of the external processing device, e.g. the processing device 220 or a second instance of the processing device 220, arranged externally of and in communication with the thermal camera 210. The temperature may be determined based on the calibration function and on a received average of the thermal image sensor signal values relating to the second part of the scene.

As mentioned above, the second period of time may be non-overlapping with the first period of time. For example, this may be the case when the first period of time during which the calibration data, e.g. the ambient temperature representing the ambient temperature at the first part of the scene and the thermal image sensor signal values, is collected precedes the second period of time during which the temperature determination in the scene is determined. In such scenarios, the calibration data is collected, and the calibration function is determined prior to the temperature determination in the scene.

However, and as also mentioned above, it should be understood that the second period of time may be at least partly overlapping with the first period of time. This may be the case when the collection of calibration data occurs during a long period of time, e.g. over one or more days, months or even over years, and when determination of the temperature in the scene is made using the latest version of the calibration function at a time point, e.g. the second time point, in the second period of time, which time point also is comprised in the first period of time. The collection of calibration data may continue after the determination of the temperature and a new, updated, calibration function may be determined based on all calibration data collected within the first period of time, i.e. including calibration data collected both before and after the temperature determination. It should be understood that sensor signal values of the image captured at the time point, e.g. the first time point, in the second period of time may be used in the determination of the calibration function prior to the determination of the temperature in the scene.

The calibration function may, as an example, be determined based on selected calibration data, for instance data selected based on, mainly or only, later time points within the first period of time.

The determining of the temperature at a second part of the scene, at a second time point in the second period of time, may be carried out in connection with the capturing of the image data at a first time point in the second period of time.

In another example, the capturing of image data at a first time point in the second period of time may be followed by storing the captured image data in a suitable image data storage, e.g. in memory 224. The following step of determining the temperature at a second part of the scene, at a second time point in the second period of time, may be carried out at a time when information about the temperature at the second part of the scene, within the captured image data, actually is needed. At this time the calibration function, determined using any of the previously described methods, is used. In this way temperature determination of a second part of the scene, in previously captured image data, may be carried out. As previously mentioned, one or more of the determined calibration functions may be stored together with a respective timestamp. The timestamp may indicate one or more points in time of the period of time during which the calibration data used in the determination of the calibration function were collected. Thus, a stored calibration function associated with a timestamp may be used at a later point in time to determine a temperature in a thermal image captured at a point in time corresponding to or being close to the point in time indicated by the timestamp. Alternatively, a calibration function, created using calibration data collected during a longer period of time, including times both before and after the first and second time points of the second period of time, may be used, as this is likely to provide a more accurate calibration function.

Action 305

In some embodiments, an alarm is indicated when a thermal image sensor signal value in a captured thermal image indicates a temperature above a temperature threshold value. The temperature threshold value may be set based on the calibration function. For example, the temperature threshold value may be set to indicate an increased temperature, e.g. a too high temperature, in an object comprised in the captured image. For example, the temperature threshold value may be set to indicate a fire in the captured image. In such case, the temperature threshold value may be set to e.g. 70 degrees Celsius. However, the temperature threshold value may be set to −40 degrees Celsius in order to indicate that a chilled item has exceeded a maximum desired temperature or to +40 degrees Celsius for an electronic device, such as a computer server, in order to indicate that the electronic device has exceeded a maximum desired temperature.

The alarm may be an audible alarm, a visual alarm, another form of alarm signal or a combination thereof.

Further, the alarm may be indicated by the thermal camera 210 and/or it may be indicated by the external processing device 220.

For example, an alarm may be indicated when a thermal image sensor signal value in a captured thermal image indicates a fire in the second part of the scene.

Figure 5:
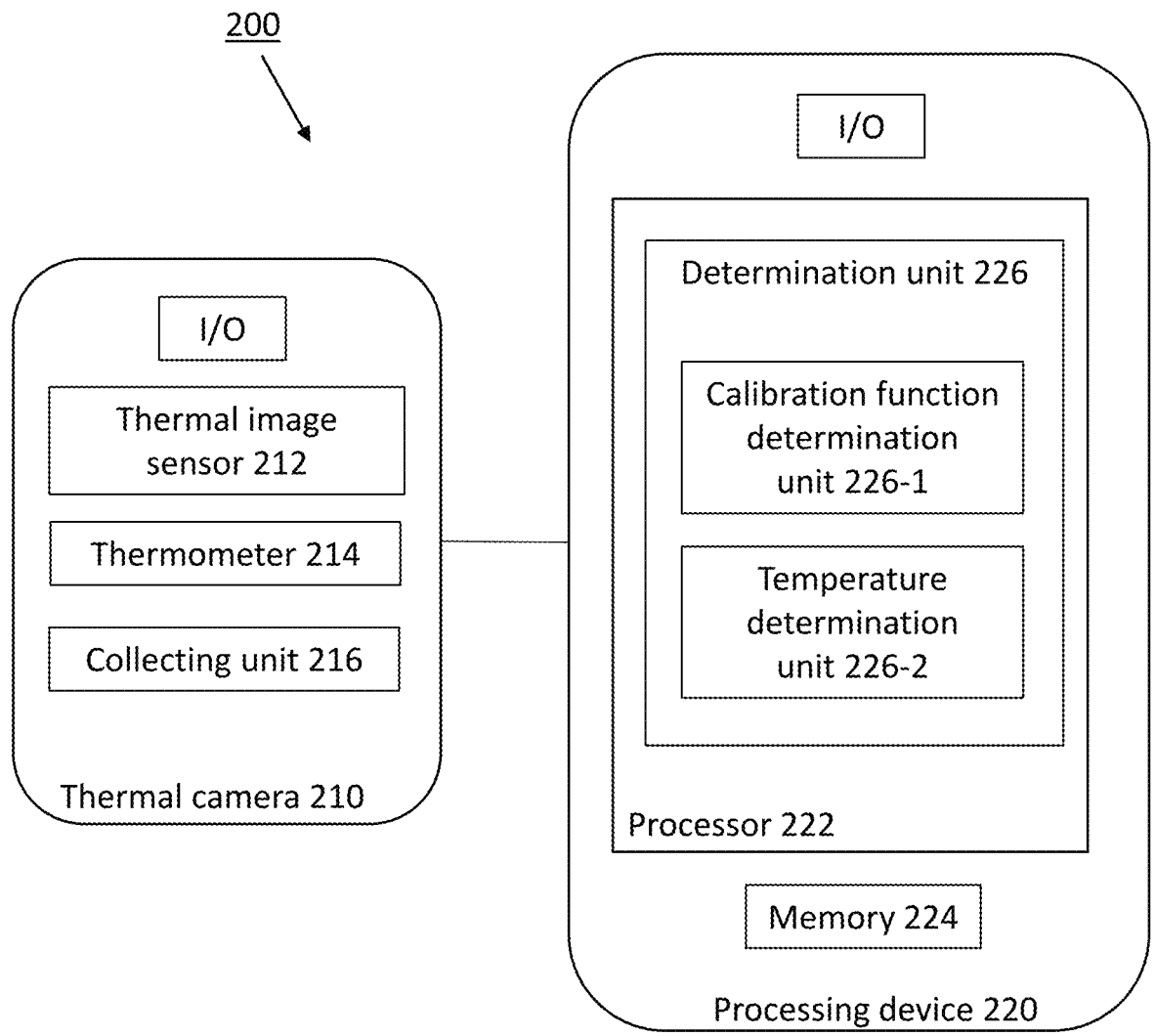
FIG. 5 schematically illustrates a thermal camera system according to embodiments.

Embodiments of a thermal camera system 200 for calibration and temperature determination will now be described with reference to FIG. 5. As previously described, the thermal camera 210 and the processing device 220 are configured to operate in the system 200. Further, the thermal camera 210 is configured to capture thermal images of the scene. As also previously mentioned, the thermal camera system 200 for temperature calibration and determination of a temperature in a scene comprises the thermal camera 210.

The thermal camera system 200 comprises a collecting unit 216 configured to, at each time point out of a plurality of time points in a first period of time, collect an ambient temperature representing a temperature at a first part of the scene. In FIG. 5, the collecting unit 216 is illustrated as being a part of the thermal camera 210. However, it should be understood that the collecting unit 216 may be arranged external of the thermal camera 210. For example, the collecting unit 216 may be comprised in the processing device 220, which processing device 220 may be comprised in the thermal camera 210 or may be arranged in communication with the thermal camera 210.

In some embodiments, the collecting unit 216 is configured to receive the collected ambient temperatures from the thermometer 214 configured to measure one or more out of the collected ambient temperatures. Alternatively, or additionally, the collecting unit 216 may be configured to collect one or more out of the collected ambient temperatures from a real-time weather-service.

The thermal camera 210 is configured to be located at the scene and configured to, at each time point out of a plurality of time points in a first period of time, collect one or more thermal image sensor signal values corresponding to the collected ambient temperatures and relating to the first part of the scene.

The thermal camera system 200 comprises a calibration determination unit 226-1 configured to determine a calibration function based on the collected ambient temperatures and the collected one or more thermal image sensor signal values corresponding to the collected ambient temperatures and relating to the first part of the scene. As previously mentioned, the calibration function gives temperature as a function of thermal image sensor value.

The calibration determination unit 226-1 may be arranged in communication with the collecting unit 216 in order to obtain, e.g. to receive or to retrieve, the collected ambient temperatures to be used in the determination of the calibration function.

The calibration function determination unit 226-1 is comprised in the processing device 220. As previously mentioned, the processing device 220 may be comprised in the thermal camera 210. Alternatively, or additionally, the processing device 220 or a second instance of the processing device 220 may be the external processing device configured to be arranged externally of and in communication with the thermal camera 210.

In some embodiments, when the collecting unit 216 and when the processing device 220 comprising the calibration function determination unit 226-1 are arranged externally of the thermal camera 210, both the collection of the ambient temperatures and the determination of the calibration function are performed externally of the thermal camera 210. In such embodiments, the thermal camera 210 obtains, e.g. receives or retrieves, the calibration function from the processing device 220. The calibration function may be associated with a timestamp indicating the point in time or the period of time, e.g. the first period of time, when the calibration data was collected.

The calibration function determination unit 226-1 may be configured to determine the calibration function as a function fitting of the collected temperatures and the collected corresponding thermal image sensor signal values.

One or more out of the collected corresponding thermal image sensor signal values used in the determining of the calibration function may be an average of thermal image sensor signal values collected at the same time point in the first period of time. This means that for at least one of the collected ambient temperatures, an average of the one or more thermal image sensor signal values corresponding to the collected ambient temperature is used in the determining of the calibration function.

Alternatively, or additionally, one or more out of the collected corresponding thermal image sensor signal values used in the determining of the calibration function may be at least one of the collected thermal image sensor signal values collected at the same time point in the first period of time.

In some embodiments, the calibration function determination unit 226-1 is configured to extrapolate the calibration function to thermal image sensor signal values giving temperatures outside the range of collected ambient temperatures.

Further, the thermal camera 210 is configured to capture, in the second period of time, the thermal image of the scene comprising thermal image sensor signal values relating to the second part of the scene. In some embodiments, the thermal camera 210 is configured to capture the thermal image at a first time point in the second period of time.

The thermal camera system 200 comprises a temperature determination unit 226-2 configured to, in a second period of time, determine a temperature at a second part of the scene. In some embodiments, the temperature determination unit 226-2 is configured to determine the temperature at a second time point in the second period of time.

Further, the temperature determination unit 226-2 is configured to determine the temperature based on the calibration function and based on one or more thermal image sensor signal values comprised in a thermal image of the scene relating to the second part of the scene. As mentioned above, the thermal image may have been captured by the thermal camera 210 at the first time point in the second period of time.

The first and second parts of the scene may correspond to at least a respective first and second part of a field of view of the thermal camera 210.

The temperature determination unit 226-2 may be configured to determine the temperature at the second part of the scene based on the calibration function and on an average of the thermal image sensor signal values relating to the second part of the scene.

In some embodiments, the temperature determination unit 226-2 is configured to indicate an alarm when a thermal image sensor signal value in a captured thermal image indicates a temperature above a temperature threshold value, wherein the temperature threshold value is set based on the calibration function.

It should be understood that the calibration function determination unit 226-1 and the temperature determination unit 226-2 described above may be two separate units comprised in the processing device 220 or one single determination unit 226 comprised in the processing device 220.

The thermal camera system 200 comprises the thermometer 214 configured to measure one or more out of the collected temperatures. As previously mentioned, the thermometer 214 may be comprised in the thermal camera 210 or it may be a thermometer arranged external of the thermal camera 210.

In some embodiments, the thermal camera system 200, e.g. by means of the collecting unit 216, is configured to collect one or more out of the collected ambient temperatures from a real-time weather service. This may for example be performed by communicating with the real-time weather service over the network 230. Thereby, ambient temperatures may be received or retrieved from the real-time weather service over the network 230.

Embodiments herein also relate to a computer program product comprising a computer-readable storage medium with instructions adapted to carry out the method according to any one of the actions described herein when executed by a processor.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for temperature calibration of a thermal camera configured to be arranged at a scene and for determination of a temperature in the scene, wherein the method comprises:
at each time point of a plurality of time points in a first period of time, collecting an ambient temperature representing a temperature at a first part of the scene to obtain collected ambient temperatures spanning over a range of ambient temperatures, and, by means of the thermal camera, collecting one or more thermal image sensor signal values corresponding to each of the collected ambient temperatures and relating to the first part of the scene so as to generate a plurality of thermal image sensor signal values,
wherein the first part of the scene comprises one or more background areas for which the one or more thermal sensor signal values are collected; and
determining a calibration function as a function fitting the collected plurality of ambient temperatures and the plurality of thermal image sensor signal values,
wherein the calibration function gives temperature as a function of thermal image sensor value; and
in a second period of time,
by means of the thermal camera, capturing a thermal image of the scene comprising thermal image sensor signal values relating to a second part of the scene; and
determining a temperature at the second part of the scene based on the calibration function and based on one or more of the thermal image sensor signal values comprised in the captured thermal image of the scene and relating to the second part of the scene.

2. The method of claim 1, wherein the first period of time and the second period of time are one out of:
non-overlapping period of times; and
at least partly over-lapping period of times.

3. The method of claim 1, wherein one or more out of the collected ambient temperatures are measured by a thermometer or are collected from a real-time weather service.

4. The method of claim 1, wherein the collected ambient temperatures represent ambient temperatures in the range of approximately −40 degrees Celsius to +50 degrees Celsius.

5. The method of claim 1, wherein, for at least one of the collected ambient temperatures, an average of the one or more thermal image sensor signal values corresponding to the collected ambient temperature is used in the determining of the calibration function.

6. The method of claim 1, wherein the determining of the calibration function further comprises:
extrapolating the calibration function to thermal image sensor signal values giving temperatures outside the range of collected ambient temperatures.

7. The method of claim 1, wherein the determining of the temperature at the second part of the scene further comprises:
determining the temperature based on the calibration function and on an average of the thermal image sensor signal values relating to the second part of the scene.

8. The method of claim 1, wherein the first and second parts of the scene are one out of:
non-overlapping parts of the scene; and
at least partly overlapping parts of the scene.

9. The method of claim 1, further comprising:
indicating an alarm when a thermal image sensor signal value in a captured thermal image indicates a temperature above a temperature threshold value.

10. A thermal camera system for temperature calibration of a thermal camera configured to be arranged at a scene and for determination of a temperature in the scene, wherein the thermal camera system comprises:
the thermal camera;
a collecting processor configured to, at each time point out of a plurality of time points in a first period of time, collect an ambient temperature representing a temperature at a first part of the scene to obtain collected ambient temperatures spanning over a range of ambient temperatures;
wherein the thermal camera is configured to, at each time point out of the plurality of time points in the first period of time, collect one or more thermal image sensor signal values corresponding to the collected ambient temperatures and relating to the first part of the scene so as to generate a plurality of thermal image sensor signal values,
wherein the first part of the scene comprises one or more background areas for which the one or more thermal sensor signal values are collected;
a calibration function determination processor configured to determine a calibration function as a function fitting the collected plurality of ambient temperatures and the collected plurality of thermal image sensor signal values, wherein the calibration function gives temperature as a function of thermal image sensor value, and
wherein thermal camera is configured to, in a second period of time, capture a thermal image of the scene comprising thermal image sensor signal values relating to a second part of the scene; and
a temperature determination processor configured to, in the second period of time, determine a temperature at the second part of the scene based on the calibration function and based on one or more of the thermal image sensor signal values comprised in the captured thermal image of the scene and relating to the second part of the scene.

11. The thermal camera system of claim 10,
wherein the collecting processor is configured to receive the collected ambient temperatures from a thermometer configured to measure one or more out of the collected ambient temperatures and/or wherein the collecting processor is configured to collect one or more out of the collected ambient temperatures from a real-time weather service.

12. The thermal camera system of claim 10, wherein the calibration function determination processor and the temperature determination processor are comprised in at least one out of:
a processing device comprised in the thermal camera; and
a processing device being an external processing device, which external processing device is configured to be arranged externally of and in communication with the thermal camera.

13. The thermal camera system of claim 10,
wherein the calibration function determination processor is configured to:
extrapolate the calibration function to thermal image sensor signal values giving temperatures outside the range of collected temperatures.

14. The thermal camera system of claim 10,
wherein the temperature determination processor is configured to:
determine the temperature at the second part of the scene based on the calibration function and on an average of the thermal image sensor signal values relating to the second part of the scene; and/or
wherein the temperature determination processor is configured to:
indicate an alarm when a thermal image sensor signal value in a captured thermal image indicates a temperature above a temperature threshold value.

* * * * *